United States Patent Office 3,406,141
Patented Oct. 15, 1968

3,406,141
DELAYED ACTION ACCELERATION FOR
VULCANIZATION OF RUBBER
Peter J. S. Bain, Wrexham, Denbighshire, Wales, and Alan Dibbo, Oswestry, Shropshire, England, assignors to Monsanto Chemicals Limited, London, England, a British company
No Drawing. Filed Feb. 8, 1965, Ser. No. 431,172
Claims priority, application Great Britain, Feb. 13, 1964, 6,059/64
3 Claims. (Cl. 260—41.5)

ABSTRACT OF THE DISCLOSURE

Methoxycarbonylmethylenebis(N,N - dimethyldithiocarbamate) is a delayed-action accelerator for vulvanization of natural and synthetic rubber containing fine particle size furnace black. Delayed action is compared to that of other members of the class and to a delayed-action sulfenamide accelerator.

This invention relates to a process for the vulcanization of rubber, more particularly to a process in which a delayed action accelerator is used in the vulcanization of rubbers containing carbon black.

The problem of premature vulcanization during the compounding of rubber and the ensuing need for vulcanization accelerators having delayed action are well recognized in rubber technology. A satisfactory delayed action accelerator is one that remains substantially inert during compounding operations but gives a reasonably rapid rate of cure when the temperature of the mixture is raised to effect vulcanization.

Premature vulcanization is encountered mainly in the processing of rubber mixes containing carbon blacks as reinforcing agents where the temperatures during compounding are unavoidably relatively high and the gap between these temperatures and the vulcanization temperature is small. For a given accelerator system and proportion of carbon black, the tendency of a mix to prevulcanize is influenced by the type of carbon black, and it is of some significance in the case of the furnace blacks. The problem is particularly serious with furnace blacks of fine particle size, of the kind for instance which are used where a high resistance to abrasion is required in the vulcanized product, for example, in the manufacture of vehicle tire treads.

We have now found that a certain bis(dithiocarbamate) is a very effective delayed action accelerator for the vulcanization of natural rubber and related synthetic rubbers in which fine-particle size furnace blacks are used as reinforcing agents. This bis(dithiocarbamate) is methoxycarbonylmethylenebis(N,N - dimethyldithiocarbamate) which is a new compound and is claimed as such.

The invention includes a process for the production of a reinforced vulcanized rubber, in which a furnace black having a fine particle size, sulfur, and an accelerating amount of the delayed action accelerator methoxycarbonylmethylenebis(N,N-dimethyldithiocarbamate) are incorporated into a polydiene hydrocarbon rubber and the mixture is vulcanized.

The class of fine-particle size furnace blacks includes those generally termed "high abrasion furnace" (HAF), "intermediate super abrasion furnace" (ISAF) and "super abrasion furnace" (SAF) blacks, in order of decreasing particle size. The actual particle sizes vary somewhat, and arithmetic mean particle diameters (determined by electron microscopy) within the range 24 to 35 millimicrons for HAF blacks, within the range 17.5 to 27.5 millimicrons for ISAF blacks, and within the range 14 to 27 millimicrons for SAF blacks, have been recorded. See for example, Studebaker, 30 Rubber Chemistry and Technology 1400 (1957). The majority of HAF, ISAF and SAF blacks currently available probably have arithmetic mean particle diameters which lie towards the lower ends of these ranges. In general a fine-particle size furnace black will have an arithmetic mean particle diameter of not more than 40 or 50 millimicrons, for instance not more than 35 millimicrons.

Examples of furnace blacks that can be used are:

Philblack 1, Vulcan 6, Statex 125 and Cosmos 70 (ISAF blacks);
Philblack 0, Vulcan 3, Statex R and Cosmos 60 (HAF blacks);
and Philblack E, Vulcan 9, Statex 160 and Cosmos 85 (SAF blacks).

The amount of carbon black used varies in accordance with established technology according to the use for which the vulcanized product is required, but in the case of vehicle tire treads, for example, is usually from 45 to 55 parts by weight per 100 parts by weight of rubber.

The preferred amount of the bis(dithiocarbamate) for use in the process is from about 0.5 to about 0.75 part by weight per 100 parts by weight of rubber.

The formula for methoxycarbonylmethylenebis(N,N-dimethyldithiocarbamate) is

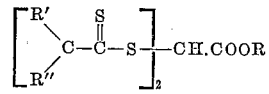

where R, R' and R" are each methyl. Other alkoxy carbonylmethylenebis(dithiocarbamates) where R is alkyl were tested as delayed action accelerators. Within this group of compounds tested, variations in the sizes of the alkyl groups have, in general, little effect on the properties of the compounds, however, methoxycarbonylmethylenebis(N,N-dimethyldithiocarbamate) has a significantly longer period of delayed action than the average. Methoxycarbonylmethylenebis(N,N-dimethyldithiocarbamate) is the preferred member of this group because of this longer delayed action when used as an accelerator.

The amount of accelerator used depends on a number of factors, including, for example, the type of rubber and the use for which the vulcanized product is required. The amount is, however, usually within the range of 0.25 to 5 parts by weight per 100 parts by weight of rubber.

Although the process is particularly suitable for the vulcanization of natural rubber, it can also be applied to the vulcanization of other polydiene hydrocarbon rubbers, including for instance synthetic cis-polyisoprene, polybutadienes, and styrene-butadiene copolymers. Synthetic rubbers produced from one or more dienes and minor amounts of other comonomers are regarded as "polydiene hydrocarbon rubbers," but the term does not include rubbers that contain a major proportion of a component other than a hydrocarbon diene.

Sulfur is normally employed in the process in conventional amounts according to the type of rubber concerned and end use required. These amounts are generally from about 1 part to about 5 parts by weight per 100 parts by weight of rubber, and in the case of tire tread stocks from about 2 to 3 parts by weight per 100 parts by weight of rubber.

If desired, the sulfur can be supplied in the form of a sulfur-containing vulcanizing agent such as for instance an amine disulfide or thiuram disulfide.

Compounding of the rubber prior to vulcanization can be carried out by conventional means and under conventional temperature conditions, using for example a roll mill or internal mixer. Normally, other commonly used ingredients, for example zinc oxide, stearic acid and an antidegradant will also be incorporated into the rubber prior to vulcanization.

The vulcanization proper is carried out at a temperature appropriate to the particular rubber concerned, for example, in the case of natural rubber, at a temperature in the range 135°–155° C.

The new dithiocarbamate can be made by the reaction of the salt, preferably an alkali metal salt, of the dimethyl substituted dithiocarbamic acid with the methyl ester of a dihaloacetic acid, for example dichloroacetic acid.

The process is conveniently conducted in an inert solvent as reaction medium. The solvent can be aqueous but is preferably organic. Acetone, which may optionally contain a small amount of water, has been found particularly suitable for this purpose. Dimethylformamide or alcohols also can be used, the alkyl radical of the alcohol preferably being the same as the alkyl group esterifying the dihaloacetic acid.

An elevated temperature, for example one in the range 50°–120° C. is usually required for a practical reaction rate, and where an inert solvent is employed the required temperature can often conveniently be maintained by boiling the reaction mixture under reflux.

The invention is illustrated by the following examples.

EXAMPLE 1

This example describes the compound and production of methoxycarbonylmethylenebis(N,N-dimethyldithiocarbamate) from methyl dichloroacetate and sodium N,N-dimethyldithiocarbamate.

400 grams (2.8 mol.) of methyl dichloroacetate were added during 1½ hours to a stirred suspension of 800 grams of sodium N,N-dimethyldithiocarbamate in 3 liters of acetone in a 5-liter flask fitted with a reflux condenser. The reaction was exothermic, and refluxing occurred after ½ hour. After the addition was complete, the reaction mixture was heated under reflux for a further two hours. A white precipitate formed during the reaction, and after cooling, this was collected by filtration. The solid was washed with water until free from chloride and dried, giving 800 grams (91.5% yield) of methoxycarbonylmethylenebis(N,N-dimethyldithiocarbamate). Crystallization from 2 liters of a mixture of 9 parts by volume of dioxane and 1 part by volume of dimethylformamide gave 700 grams of a purified product having a melting point of 213° C. (with decomposition). (Found: C, 35.04; H, 5.22; N, 9.01; S, 40.57. $C_9H_{16}N_2O_2S_4$ requires C,34.60; H, 5.16; N, 8.97; S, 41.02%).

EXAMPLE 2

This example describes experiments designed to assess the delayed action and cure rates of a number of methylenebis-(dithiocarbamates) in a natural rubber stock containing an HAF black (Vulcan 3).

The stock was a typical tire tread stock having the following composition:

| Material: | Parts by weight |
|---|---|
| Smoked sheets | 100 |
| High abrasion furnace black | 50 |
| Zinc oxide | 5 |
| Stearic acid | 3 |
| Tackol 2 (process oil) | 3 |
| Sulfur | 2.5 |
| Accelerator | 0.5 |

The test for delayed action was the standard Mooney viscosity procedure carried out at 121° C. The period of delayed action was recorded as the time taken for the viscosity reading to reach 10 units above the minimum. Cure rate was determined by recording the time taken for the stock to obtain 90% of its optimum cure at 140° C. as measured by the Agfa Vulcameter.

The results, which include for comparison figures obtained on two established delayed action accelerators of the sulfenamide class, are given in the following table. Each figure is the mean of two determinations.

TABLE 1

| Compound | Mooney Scorch T(L+10) at 121° C. (minutes) | Time to optimum cure at 140° C. (minutes) |
|---|---|---|
| Methoxycarbonylmethylenebis (N,N-dimethyldithiocarbamate) | 29 | 22 |
| Neopentyloxycarbonylmethylenebis(N,N-dimethyldithiocarbamate) | 24 | 24 |
| n-Heptyloxycarbonylmethylenebis(N,N-dimethyldithiocarbamate) | 22 | 22 |
| Methyl bis[morpholino-(thiocarbonyl)thio]acetate | 24 | 22 |
| Methyl bis[2,6-dimethylmorpholino-(thiocarbonyl)thio]acetate | 24 | 22 |
| N-cyclohexylbenzthiazyl-2-sulfenamide | 28 | 24 |
| 2(morpholinothio)benzothiazole | 32 | 28 |

All the dithiocarbamates show a useful degree of delayed action, and a satisfactory cure rate. Methoxycarbonyl - methylenebis(N,N-dimethyldithiocarbamate) is seen to be outstanding in having a delayed action in the same range as the sulfenamides while giving a significantly faster rate of cure.

EXAMPLE 3

This example gives the results of experiments carried out to compare the effect of different types of furnace black on delayed action and cure rate in stocks containing methoxycarbonylmethylenebis(N,N - dimethyldithiocarbamate) (designated A in Table 2) and 2(morpholinothio)benzothiazole (designated B in Table 2) as accelerators, again using the Mooney viscometer and Agfa Vulcameter respectively. The stocks had the composition:

| | Parts by weight |
|---|---|
| Smoked sheets | 100 |
| Carbon black | 50 |
| Zinc oxide | 5 |
| Stearic acid | 3 |
| Process oil | 3 |
| Sulfur | 2.5 |
| Accelerator | 0.5 |

The results are shown in Table 2 below.

TABLE 2

| Accelerator | Carbon Black | Mooney Scorch at 121° C. T(L+10) (minutes) | Time to Optimum Cure at 140° C. (minutes) |
|---|---|---|---|
| A | HAF | 26 | 17 |
| B | HAF | 30 | 23 |
| A | ISAF | 20 | 15 |
| B | ISAF | 19 | 22 |
| A | SAF | 12 | 16 |
| B | SAF | 13 | 25 |

Methoxycarbonylmethylenebis(N,N - dimethyldithiocarbamate) is seen to give in all cases a significantly faster rate of cure than the sulfenamide accelerator, while having a comparable delayed action, particularly with ISAF and SAF blacks.

It is intended to cover all changes and modifications of the examples of the invention herein chosen for purposes of disclosure which do not constitute departures from the spirit and scope of the invention.

What is claimed is:

1. A process for the production of a reinforced vulcanized polydiene hydrocarbon rubber in which a furnace black having fine particle size, sulfur, and an accelerating amount of methoxycarbonylmethylenebis(N,N-dimethyldithiocarbamate) are incorporated into a polydiene hydrocarbon rubber and the mixture is vulcanized.

2. A process for the production of a reinforced vulcanized natural rubber in which a furnace black having fine particle size, sulfur, and an accelerating amount of methoxycarbonylmethylenebis(N,N - dimethyldithiocarbamate) are incorporated into natural rubber and the mixture is vulcanized.

3. A vulcanizable rubber composition comprising polydiene hydrocarbon rubber, a furnace black having a fine particle size, sulfur, and an accelerating amount of methoxycarbonylmethylenebis(N,N - dimethyldithiocarbamate).

References Cited

UNITED STATES PATENTS 2,188,280  1/1940  Lichty _____ 260—793

FOREIGN PATENTS 406,379  3/1934  Great Britain.

JULIUS FROME, *Primary Examiner.*

J. E. CALLAGHAN, *Assistant Examiner.*